(12) United States Patent
Tayama et al.

(10) Patent No.: US 7,188,589 B2
(45) Date of Patent: Mar. 13, 2007

(54) DIRECT INJECTION INTERNAL COMBUSTION ENGINE

(75) Inventors: Akira Tayama, Kanagawa (JP); Hirofumi Tsuchida, Kanagawa (JP); Koji Hiraya, Yokohama (JP); Yutaka Matayoshi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/187,235

(22) Filed: Jul. 22, 2005

(65) Prior Publication Data

US 2006/0032478 A1 Feb. 16, 2006

(30) Foreign Application Priority Data

Aug. 11, 2004 (JP) ............................. 2004-234112

(51) Int. Cl.
*F01P 1/10* (2006.01)
*F02F 1/40* (2006.01)

(52) U.S. Cl. ................. 123/41.82 R; 123/309; 123/41.32

(58) Field of Classification Search ............... 123/298, 123/305, 41.82 R, 309, 41.31, 41.32
See application file for complete search history.

(56) References Cited

U.S. PATENT DOCUMENTS

| 4,770,138 | A | * | 9/1988 | Onishi | 123/276 |
| 5,724,937 | A | * | 3/1998 | Bezner et al. | 123/275 |
| 5,799,627 | A | * | 9/1998 | Dohn et al. | 123/41.82 R |
| 5,983,853 | A | * | 11/1999 | Roessler et al. | 123/295 |
| 6,095,114 | A | * | 8/2000 | Horie et al. | 123/298 |
| 6,196,185 | B1 | * | 3/2001 | Jingu | 123/302 |
| 6,543,408 | B1 | * | 4/2003 | Ernst et al. | 123/295 |
| 6,745,745 | B2 | * | 6/2004 | Huebler et al. | 123/307 |
| 6,748,917 | B1 | * | 6/2004 | Hoffmann et al. | 123/295 |
| 6,799,550 | B2 | * | 10/2004 | Wirth | 123/275 |
| 2004/0200444 | A1 | * | 10/2004 | Sugano et al. | 123/41.82 R |
| 2005/0051114 | A1 | * | 3/2005 | Baba et al. | 123/41.55 |

FOREIGN PATENT DOCUMENTS

JP 11-22592 A 1/1999

* cited by examiner

*Primary Examiner*—Hai Huynh
(74) *Attorney, Agent, or Firm*—Foley & Lardner LLP

(57) ABSTRACT

In a direct injection internal combustion engine, a fuel injection valve and a spark plug of adjacent cylinders are inclined at different angles from each other in directions perpendicular to a cylinder arrangement direction in which the cylinders are arranged. Besides, the fuel injection valve and the spark plug of at least one of the cylinders are inclined at different angles from each other in directions parallel to the cylinder arrangement direction. A cooling channel is provided between the fuel injection valve and the spark plug of the at least one of the cylinders.

7 Claims, 2 Drawing Sheets

DIRECT INJECTION INTERNAL COMBUSTION ENGINE

BACKGROUND OF THE INVENTION

The present invention relates to a direct injection internal combustion engine of a center injection type in which a fuel injection valve and a spark plug are disposed at a middle part of an upper part of a combustion chamber.

In a spark ignition combustion, fuel is injected directly from a fuel injection valve into a cylinder to form a stratified air-fuel mixture in the cylinder. An internal combustion engine thereby performs a wide-ranging lean burn or combustion. Such internal combustion engine can largely reduce a fuel consumption especially in a low/intermediate-load combustion.

Japanese Patent Application Publication No. H11(1999)-22592 discloses a direct injection internal combustion engine of a center injection type in which a fuel injection valve is disposed at a middle part of an upper part of a combustion chamber, and a spark plug is directed toward a central part of the combustion chamber. In such direct gasoline-injection engine, fuel is injected from the middle part of the upper part of the combustion chamber toward the central part of the combustion chamber to form a stratified air-fuel mixture in a wide-ranging area. Such direct gasoline-injection engine thereby can perform a stratified charge combustion in a wide region of operating range.

SUMMARY OF THE INVENTION

In the above-mentioned internal combustion engine, the fuel injection valve is disposed at the middle part of the upper part of the combustion chamber, and thus is exposed to high temperature. This causes coking of the fuel to be deposited on inside and outside parts of the fuel injection valve, and thereby deteriorates capability of the fuel injection valve to inject the fuel. As a result, the above-mentioned internal combustion engine may not be able to perform an efficient stratified charge operation.

To improve this problem, cooling the fuel injection valve is an effective measure. In the above-mentioned internal combustion engine of earlier technology, however, the spark plug is disposed beside the fuel injection valve, and it is therefore difficult to provide a cooling channel between the fuel injection valve and the spark plug. If it is possible to provide a cooling channel between the fuel injection valve and the spark plug, such cooling channel would have a small width and be located far from an end portion of the fuel injection valve, and thus could not sufficiently cool the end portion of the fuel injection valve.

If the fuel injection valve and the spark plug are spaced far from each other to provide a cooling channel in vicinity of the fuel injection valve, the above-mentioned direct injection internal combustion engine of the center injection type cannot form a stratified air-fuel mixture in a wide-ranging area and perform a stratified charge combustion in a wide region of operating range.

If the fuel injection valve and the spark plug are inclined largely toward opposite directions which are parallel to a direction in which cylinders are arranged, it is possible to provide a large cooling channel in a thus-enlarged space therebetween. However, because of a fuel line provided above the fuel injection valve, and a high-tension cable or an ignition coil provided above the spark plug, the fuel line and the high-tension cable or the ignition coil of adjacent cylinders may interfere with each other. As heretofore described, it is difficult for such direct injection internal combustion engine of earlier technology to sufficiently cool the end portion of the fuel injection valve.

It is an object of the present invention to provide a direct injection internal combustion engine of a center injection type which is capable of cooling a fuel injection valve effectively by a large cooling channel formed between the fuel injection valve and a spark plug.

According to one aspect of the present invention, a direct injection internal combustion engine, includes: a fuel injection valve including an injection nozzle formed with a nozzle hole facing toward a central part of a combustion chamber and arranged to inject fuel directly into the combustion chamber; a spark plug including an electrode facing toward the central part of the combustion chamber and arranged to spark-ignite the fuel injected from the fuel injection valve, the fuel injection valve and the spark plug of adjacent cylinders being inclined at different angles from each other in directions perpendicular to a cylinder arrangement direction in which the cylinders are arranged, and the fuel injection valve and the spark plug of at least one of the cylinders being inclined at different angles from each other in directions parallel to the cylinder arrangement direction; and a portion defining a cooling channel between the fuel injection valve and the spark plug of the at least one of the cylinders.

The other objects and features of this invention will become understood from the following description with reference to the accompanying drawings.

DETAILED DESCRIPTION OF THE INVENTION

Figure 1:
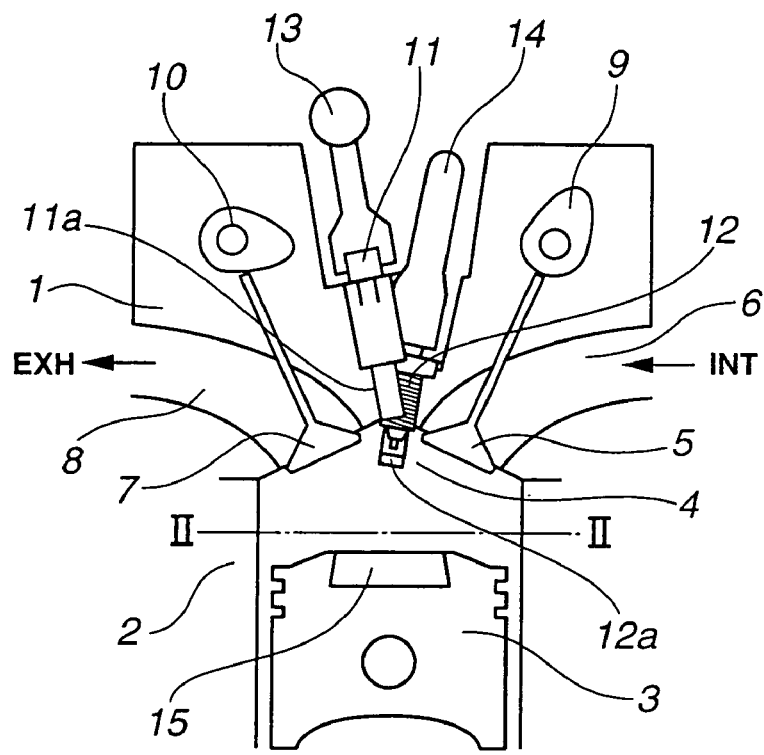
FIG. 1 is a view showing a direct injection internal combustion engine according to an embodiment of the present invention, as viewed from front of the engine.
Figure 2:
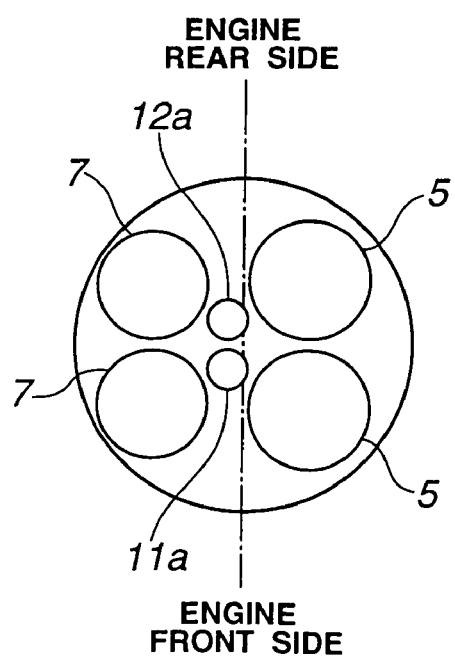
FIG. 2 is a sectional view taken along a line II—II in FIG. 1, as viewed from downward of the engine.
Figure 3:
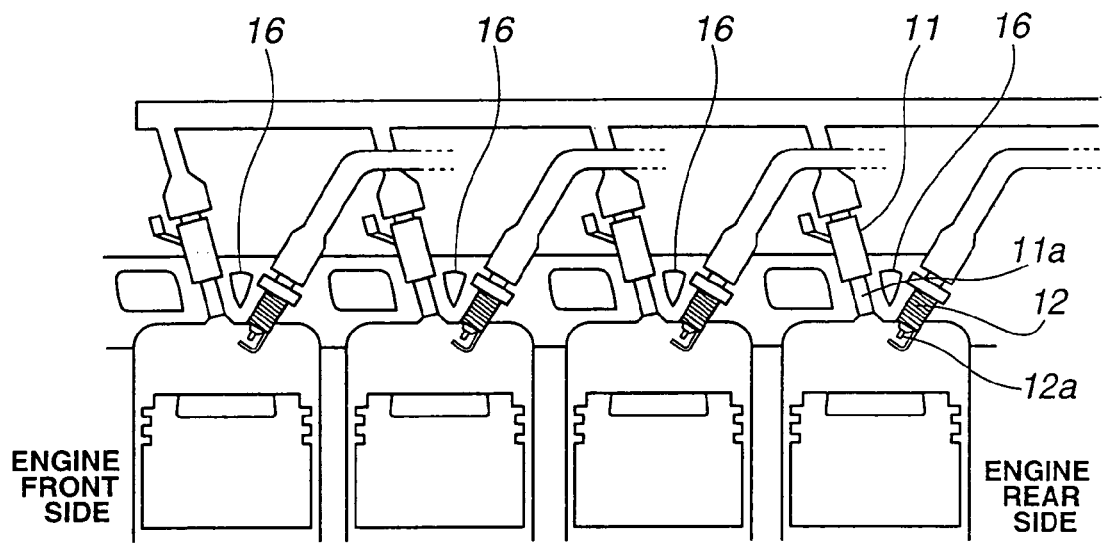
FIG. 3 is a view showing the direct injection internal combustion engine of FIG. 1, as viewed from side of the engine.

FIG. 1 is a view showing a direct injection internal combustion engine according to an embodiment of the present invention, as viewed from front of the engine. FIG. 2 is a sectional view taken along a line II—II in FIG. 1, as viewed from downward of the engine. FIG. 3 is a view showing the direct injection internal combustion engine of FIG. 1, as viewed from side of the engine.

The direct injection internal combustion engine of this embodiment includes a cylinder head 1 and a cylinder block 2 forming a plurality of cylinder portions or cylinders arranged in a cylinder arrangement direction. Each of the cylinder portions includes a piston 3, intake valves 5, intake ports 6, exhaust valves 7, and exhaust ports 8. Cylinder head 1, cylinder block 2 and piston 3 define a combustion chamber 4. Cylinder head 1 forms an upper surface of combustion chamber 4. Combustion chamber 4 communicates with intake ports 6 and exhaust ports 8 respectively via intake valves 5 and exhaust valves 7.

The direct injection internal combustion engine of this embodiment or each of the cylinder portions also includes intake valve cams or intake cams 9, exhaust valve cams or exhaust cams 10, a fuel injection valve 11, a spark plug 12, a high-pressure fuel line 13, a high-tension cable 14, and a portion defining a cooling channel 16. Intake valves 5 and exhaust valves 7 are actuated to open and close by intake valve cams 9 and exhaust valve cams 10, respectively.

Fuel injection valve 11 and spark plug 12 are disposed at the upper surface or upper part of combustion chamber 4 with inclinations, as described hereinbelow. Fuel injection valve 11 includes an injection nozzle 11a formed with a nozzle hole. Spark plug 12 includes an electrode 12a. The nozzle hole or injection nozzle 11a, and electrode 12a face toward a central part of combustion chamber 4. High-pressure fuel line 13 is connected with an upper portion of fuel injection valve 11. High-tension cable 14 is connected with an upper portion of spark plug 12. Fuel is supplied via high-pressure fuel line 13 to fuel injection valve 11 to be injected directly from the nozzle hole of injection nozzle 11a into combustion chamber 4.

Piston 3 includes a crown surface formed with a cavity 15 located at a central part of the crown surface. Cavity 15 is formed in a substantially cylindrical shape coaxial with an axis of fuel spray to be injected from fuel injection valve 11. The fuel injected from fuel injection valve 11 is to be headed toward a region above cavity 15 via (or directed back from) cavity 15 to form a stratified air-fuel mixture. The stratified air-fuel mixture is ignited by electrode 12a of spark plug 12 to conduct a stratified charge combustion.

Fuel injection valve 11 and spark plug 12 are inclined at different angles (first and second angles; third and fourth angles) from each other in directions perpendicular to the cylinder arrangement direction. Fuel injection valve 11 and spark plug 12 may be inclined in any such perpendicular directions as long as the angles are different from each other: one of fuel injection valve 11 and spark plug 12 may be inclined at an angle of zero with respect to a vertical direction of the engine, i.e., disposed upright, and the other may be inclined at any angle; fuel injection valve 11 and spark plug 12 may be inclined toward opposite sides; or fuel injection valve 11 and spark plug 12 may be inclined toward a same side as long as the angles are different from each other.

In a state where fuel injection valve 11 and spark plug 12 are inclined at different angles from each other in directions perpendicular to the cylinder arrangement direction as shown in FIG. 1, fuel injection valve 11 and high-pressure fuel line 13 are prevented from interfering with spark plug 12 and high-tension cable 14 of one of the adjacent cylinder portions or cylinders. Therefore, fuel injection valve 11 and spark plug 12 of a same cylinder or cylinder portion can be inclined largely at different angles (fifth and sixth angles) from each other in directions parallel to the cylinder arrangement direction, as shown in FIG. 3. Cooling channel 16 is provided in a thus-enlarged space between fuel injection valve 11 and spark plug 12 of the same cylinder or cylinder portion. Therefore, fuel injection valve 11 can be cooled effectively. This prevents coking of the fuel and its deposition on inside and outside parts of fuel injection valve 11, and thereby prevents deterioration of capability of fuel injection valve 11 to inject the fuel. Thus, the direct injection internal combustion engine of this embodiment can perform the stratified charge operation efficiently.

To widen cooling channel 16, fuel injection valve 11 and spark plug 12 may preferably be inclined more largely toward opposite directions parallel to the cylinder arrangement direction, as shown in FIG. 3. However, depending on combustion performance and other layout limitations of the engine, one of fuel injection valve 11 and spark plug 12 may be disposed upright with respect to the engine, i.e., disposed at an angle of zero with respect to the vertical direction of the engine.

For a direct injection internal combustion engine of a center injection type to perform a stratified charge combustion in a wide-ranging area, an injection nozzle or nozzle hole of a fuel injection valve may preferably be disposed at a middle part of an upper part of a combustion chamber. Also, to increase efficiency of such stratified charge combustion, an electrode of a spark plug may preferably be disposed at the middle part of the upper part of the combustion chamber. Therefore, in the four-valve engine of this embodiment, injection nozzle 11a and electrode 12a may preferably be disposed in a location surrounded by intake valves 5 and exhaust valves 7. In this case, injection nozzle 11a and electrode 12a may be arranged in line in a direction perpendicular to the cylinder arrangement direction, or alternatively, may be arranged in line in the cylinder arrangement direction.

If the injection nozzle and the electrode are arranged in line in a direction perpendicular to the cylinder arrangement direction, the fuel injection valve and the spark plug have to be inclined in directions perpendicular to the cylinder arrangement direction at small angles, because of interference with an intake camshaft and an exhaust camshaft located above. Consequently, it becomes difficult to provide a wide cooling channel in a space between the fuel injection valve and the spark plug of a same cylinder or cylinder portion.

By contrast, in this embodiment as shown in FIG. 2 in which injection nozzle 11a and electrode 12a are arranged in line in the cylinder arrangement direction, fuel injection valve 11 and spark plug 12 can be inclined in directions parallel to the cylinder arrangement direction at large angles, without interference with the intake camshaft and the exhaust camshaft. Consequently, wide cooling channel 16 can be provided in a space between fuel injection valve 11 and spark plug 12, as shown in FIG. 3.

Figure 4:
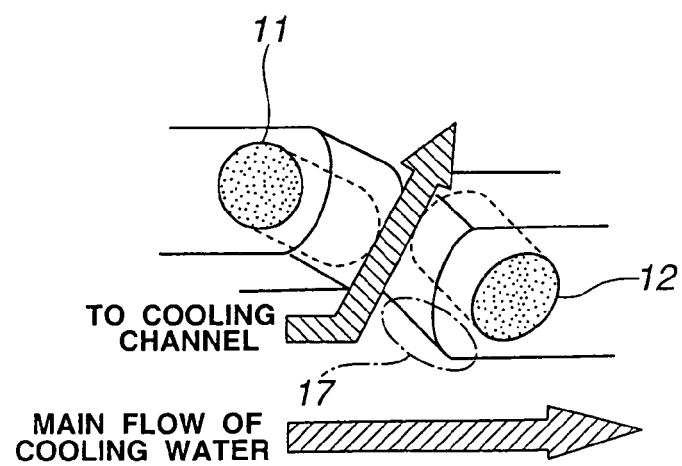
FIG. 4 is a detail view showing an arrangement of cooling channel 16.

FIG. 4 is a detail view showing an arrangement of cooling channel 16. In a part located upstream of main flow of cooling water, water temperature is relatively low, and cooling channel 16 can be provided with a large width. Therefore, fuel injection valve 11 may be positioned upstream of the main flow of the cooling water, as shown in FIG. 4, and thus can be cooled effectively. In this case, spark plug 12 may be positioned downstream of the flow of the cooling water, as shown in FIG. 4. Positions of fuel injection valve 11 and spark plug 12 may be interchanged (i.e., spark plug to position 11 and fuel injection valve to position 12 in FIG. 4) due to other limitations.

Cooling channel 16 may be arranged, not perpendicularly to the main flow of the cooling water, but obliquely with respect to the main flow of the cooling water, as shown in FIG. 4. This arrangement promotes inflow of the cooling water to cooling channel 16, and thus can enhance cooling effect for fuel injection valve 11.

Besides, fuel injection valve 11 (or spark plug at position 11 as mentioned above) positioned upstream of the main flow of the cooling water may be inclined toward an exit of cooling channel 16, i.e., toward a side opposite from an entrance of cooling channel 16, as shown in FIG. 4. This promotes inflow of the cooling water to cooling channel 16, and thus can enhance cooling effect for fuel injection valve 11.

Further, the direct injection internal combustion engine of this embodiment or each of the cylinder portions may also include a block 17. Block 17 is located at the entrance of cooling channel 16, and projects against the main flow of the cooling water, as shown in FIG. 4. A part of the main flow collides with block 17, and the cooling water is forced to flow into cooling channel 16. Thus, the direct injection internal combustion engine of this embodiment can promote inflow of the cooling water to cooling channel 16, and thereby can enhance cooling effect for fuel injection valve 11.

According to another aspect of the present invention, the direct injection internal combustion engine, includes: means (11) for performing an injecting operation of injecting fuel from a first position directly into a combustion chamber; means (12) for performing an igniting operation of spark-igniting the fuel from a second position, the fuel being injected by the injecting operation, the first position and the second position being inclined at different angles from each other in directions perpendicular to a cylinder arrangement direction in which cylinders are arranged, and the first position and the second position being inclined at different angles from each other in directions parallel to the cylinder arrangement direction; and means (16) for performing a cooling operation of cooling at least the first position from a third position defined between the first position and the second position.

This application is based on a prior Japanese Patent Application No. 2004-234112 filed on Aug. 11, 2004. The entire contents of this Japanese Patent Application No. 2004-234112 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A direct injection internal combustion engine, comprising:
a first cylinder assembly having a first cylinder bore to define a first combustion chamber;
a second cylinder assembly located adjacent to the first cylinder assembly and having a second cylinder bore to define a second combustion chamber; and
a portion defining a first cooling channel and a second cooling channel,
the first and second cylinder bores being arranged in a cylinder arrangement direction,
the first cylinder assembly including a first fuel injection valve having an injection nozzle facing toward a central part of the first combustion chamber and arranged to inject fuel directly into the first combustion chamber, and
a first spark plug having an electrode facing toward the central part of the first combustion chamber and arranged to spark-ignite the fuel injected from the first fuel injection valve,
the second cylinder assembly including a second fuel injection valve having an injection nozzle facing toward a central part of the second combustion chamber and arranged to inject fuel directly into the second combustion chamber and a second spark plug having an electrode facing toward the central part of the second combustion chamber and arranged to spark-ignite the fuel injected from the second fuel injection valve,
the first fuel injection valve, when viewed in a direction parallel to the cylinder arrangement direction, being inclined at a first angle with respect to the longitudinal axis of the first cylinder bore, in a first direction and, when viewed in a direction perpendicular to the cylinder arrangement direction, inclined at a second angle, with respect to the longitudinal axis of the first cylinder bore, in a second direction,
the second fuel injection valve, when viewed in the direction parallel to the cylinder arrangement direction, being inclined at the first angle, with respect to the longitudinal axis of the second cylinder bore, in the first direction and, when viewed in the direction perpendicular to the cylinder arrangement direction, inclined at the second angle, with respect to the longitudinal axis of the second cylinder bore, in the second direction,
the first spark plug when viewed in the direction parallel to the cylinder arrangement direction, being inclined at a third angle, with respect to the longitudinal axis of the first cylinder bore, in a third direction and, when viewed in a direction perpendicular to the cylinder arrangement direction, inclined at a fourth angle, with respect to the longitudinal axis of the first cylinder bore, in a fourth direction,
the second spark plug, when viewed in the direction parallel to the cylinder arrangement direction, being inclined at the third angle, with respect to the longitudinal axis of the second cylinder bore, in the third direction and, when viewed in the direction perpendicular to the cylinder arrangement direction, inclined at the fourth angle, with respect to the longitudinal axis of the second cylinder bore, in the fourth direction,
the third angle being different from the first angle,
the fourth angle being different from the second angle,
the first cooling channel extending between the first fuel injection valve and the first spark plug, and
the second cooling channel extending between the second fuel injection valve and the second spark plug.

2. The direct injection internal combustion engine as claimed in claim 1, wherein the first fuel injection valve is positioned upstream of flow of a first cooling water to flow in the first cooling channel; the first spark plug is positioned downstream of the flow of the first cooling water; the second fuel injection valve is positioned upstream of flow of a second cooling water to flow in the second cooling channel; and the second spark plug is positioned downstream of the flow of the second cooling water.

3. The direct injection internal combustion engine as claimed in claim 1, wherein the injection nozzle of the first fuel injection valve and the electrode of the first spark plug are arranged substantially in line parallel to the cylinder arrangement direction; and the injection nozzle of the second fuel injection valve and the electrode of the second spark plug are arranged substantially in line parallel to the cylinder arrangement direction.

4. The direct injection internal combustion engine as claimed in claim 1, wherein the first cooling channel is arranged obliquely between the first fuel injection valve and the first spark plug with respect to a main cooling channel; and the second cooling channel is arranged obliquely between the second fuel injection valve and the second spark plug with respect to the main cooling channel.

5. The direct injection internal combustion engine as claimed in claim 1, wherein one of the first fuel injection valve and the first spark plug positioned upstream of a main flow of cooling water and one of the second fuel injection valve and the second spark plug positioned upstream of the main flow of cooling water are inclined toward a side opposite from an entrance of the first cooling channel and an entrance of the second cooling channel, respectively.

6. The direct injection internal combustion engine as claimed in claim 1, further comprising first and second blocks located at entrances of the first and second cooling channels, respectively, and projecting against a main flow of cooling water.

7. The direct injection internal combustion engine as claimed in claim 1, wherein a first leg of the first angle and a first leg of the third angle comprise the respective longitudinal axis of the respective cylinder bore, and wherein a second leg of the first angle and a second leg of the third angle are on opposite sides of the respective longitudinal axis of the respective cylinder bore when viewed in a direction parallel to the cylinder arrangement direction, and wherein a first leg of the second angle and a first leg of the fourth angle comprise the respective longitudinal axis of the respective cylinder bore, and wherein a second leg of the second angle and a second leg of the fourth angle are on opposite sides of the respective longitudinal axis of the respective cylinder bore when viewed in a direction perpendicular to the cylinder arrangement direction.

* * * * *